US 10,649,300 B2

(12) United States Patent
Engfeldt et al.

(10) Patent No.: US 10,649,300 B2
(45) Date of Patent: May 12, 2020

(54) METHOD FOR CONTROLLING AN ELECTROCHROMIC DEVICE AND AN ELECTROCHROMIC DEVICE

(71) Applicant: ChromoGenics AB, Uppsala (SE)

(72) Inventors: Johnny D. Engfeldt, Uppsala (SE); Greger Gregard, Uppsala (SE)

(73) Assignee: CHROMOGENICS AB, Uppsala (SE)

( * ) Notice: Subject to any disclaimer, the term of this patent is extended or adjusted under 35 U.S.C. 154(b) by 117 days.

(21) Appl. No.: 16/068,893

(22) PCT Filed: Jan. 9, 2017

(86) PCT No.: PCT/SE2017/050012
§ 371 (c)(1),
(2) Date: Jul. 9, 2018

(87) PCT Pub. No.: WO2017/123138
PCT Pub. Date: Jul. 20, 2017

(65) Prior Publication Data
US 2019/0018298 A1    Jan. 17, 2019

(30) Foreign Application Priority Data

Jan. 12, 2016  (SE) ........................ 1650030

(51) Int. Cl.
G02F 1/15 (2019.01)
G02F 1/163 (2006.01)
(Continued)

(52) U.S. Cl.
CPC .............. *G02F 1/163* (2013.01); *G09G 3/19* (2013.01); *G09G 3/38* (2013.01); *G09G 2320/043* (2013.01); *G09G 2320/0693* (2013.01)

(58) Field of Classification Search
CPC . G02F 1/163; G09G 3/19; G09G 3/38; G09G 2320/043; G09G 2320/0693
(Continued)

(56) References Cited

U.S. PATENT DOCUMENTS 5,822,107 A   10/1998 Lefrou et al.
7,277,215 B2  10/2007 Greer
(Continued)

FOREIGN PATENT DOCUMENTS

EP       2161615 A1    3/2010
TW    201341926 A    10/2013

*Primary Examiner* — William Choi
(74) *Attorney, Agent, or Firm* — Porter Wright Morris & Arthur LLP

(57) ABSTRACT

A method for controlling an electrochromic device comprises obtaining (210) of a target colouring level and a measure of an initial colouring level. A measure of an initial open circuit voltage between electrodes of the electrochromic device is obtained (220). A voltage applied between the electrodes is calibration ramped (230). A calibration charging current is measured (232) during the calibration ramping of the voltage. The calibration ramping of the voltage is interrupted (236), intermittently and temporarily and a calibration open circuit voltage is measured (238). The calibration ramping is stopped (240) when a calibration condition is met. A constant main charging/discharging voltage between the electrodes of the electrochromic device is applied (250). The voltage is selected in dependence of the ramped voltage when stopped. Application of a voltage between the electrodes is removed (270) when target colouring level is reached. An electrochromic device capable of performing such procedure is disclosed.

20 Claims, 5 Drawing Sheets

(51) Int. Cl.
*G09G 3/19* (2006.01)
*G09G 3/38* (2006.01)

(58) Field of Classification Search
USPC .................................................. 359/265–275
See application file for complete search history.

(56) References Cited

U.S. PATENT DOCUMENTS

| | | |
|---|---|---|
| 9,091,897 B2 | 7/2015 | Chung |
| 2004/0001056 A1 | 1/2004 | Atherton et al. |
| 2010/0172009 A1 | 7/2010 | Matthews |
| 2015/0002919 A1 | 1/2015 | Jack et al. |
| 2015/0070745 A1 | 3/2015 | Pradhan |
| 2016/0041447 A1* | 2/2016 | Yamamoto .............. G02F 1/163 |
| | | 359/275 |

* cited by examiner

METHOD FOR CONTROLLING AN ELECTROCHROMIC DEVICE AND AN ELECTROCHROMIC DEVICE

TECHNICAL FIELD

The present document relates in general to control of electrochromic devices and in particular methods and devices for controlling electrochromic devices.

BACKGROUND

Electrochromic devices, able to control their light transmittance, have been used in many different applications. Some examples are vehicle mirrors, construction windows, spectacles or different kinds of imaging devices. The transmittance is typically controlled by charging or discharging the electrochromic device. A typical electrochromic device comprises an electrochromic layered structure where an electrochromic layer and a counter electrode layer is separated by an electrolyte layer. By changing an electric potential between the electrochromic layer and the counter electrode layer, ions or electrons are caused to pass the electrolyte layer and the result is a changing or a discharging of the electrochromic layered structure, resulting in a colouring or bleaching of the electrochromic layer and/or counter electrode layer.

When a change of transmittance is requested, the charge of the electrochromic layered structure is to be changed. The change is typically requested to be performed as rapidly as possible, which is favoured by applying a high voltage across the electrochromic device. However, electrochromic devices may be damaged, or at least the life time of an electrochromic device may be significantly reduced is too high voltages are applied. It is therefore necessary to find a suitable compromise between transition time and applied voltages.

The optimum charging/discharging conditions for an electrochromic device may furthermore vary depending on the surrounding conditions, mainly the temperature. The optimum charging/discharging conditions for an electrochromic device may also vary from one application to another depending on e.g. the connections to the electrochromic layer. Differences in connection resistances will e.g. influence the optimum choice of charging/discharging conditions. Also, for one and the same device, the response to an applied voltage will change with time as the device becomes older. These effects are also typically more pronounced for large area devices.

In prior art, there are many different approaches for improving the transmittance control. In order to optimize the charging, it is common to use some kind of transmittance sensor and/or temperature sensor. The charging behaviour could then be adapted to the measured transmittance level/temperature. Some approaches utilizing actual measurements of transmittance and/or temperature are found in e.g. the U.S. Pat. No. 5,822,107, where a method is discloses that combines time control with measurements of physical characteristics such as voltage, current or light transmittance of the glazing. Preferably, also the temperature is measured by e.g. a thermocouple. In the published European patent application EP 2 161 615 A1 a process and apparatus for switching large-area electrochromic devices is disclosed. Presented conditions for charging/discharging are presented to be temperature dependent, which implicitly requires a temperature sensor to be available.

However, the inclusion of sensors increases the complexity and cost, and increases the risk that some assisting component may fail before the electrochromic film is worn out. The more components that are involved, the higher is the probability that some parts will malfunction. Furthermore, the sensors are often provided at a part of the window itself, either visibly from outside or hidden under some kind of frame. Transmittance sensors will typically occupy a part of the active area and temperature sensors also preferably are attached in the very vicinity of an active area, thereby reducing the available area. Moreover, mounting of sensors will add to the complexity and sensitivity for damage during mounting operations.

Other approaches for controlling charging/discharging of electrochromic devices utilizes electrical quantities. One example is illustrated in the published US patent application US 2004/0001056 A1. In the published U.S. Pat. No. 7,277,215 B2, a control system for electrochromic devices is disclosed. The document is primarily targeting electrochromic devices with solid-state electrolytes, in which leak currents is a problem. An open circuit voltage and a charging current are measured. By means of such measurements, temperatures or hysteresis curves can be estimated. It is however, not described how or even if optimum charging conditions can be deduced from such information. Similar control methods are disclosed also in the published US patent application US 2015/0070745 A1, also targeting electrochromic devices with solid-state electrolytes, in which leak currents are present.

A problem with prior art is that one wants to avoid use of external sensors, and still find suitable charging/discharging conditions for varying ages, configurations and surrounding conditions.

SUMMARY

A general object of the present technology is to provide devices and method for improved control of charging/discharging of electrochromic devices, not being dependent on temperature or transmittance sensors.

This object is achieved by devices and methods according to the attached independent patent claims. Preferred embodiments are defined in dependent claims. In general words, in a first aspect, a method for controlling an electrochromic device, which presents a transmittance being dependent on a charge of the electrochromic device, is presented. The method comprises obtaining of a target colouring level and a measure of an initial colouring level. A measure of an initial open circuit voltage between electrodes of the electrochromic device is obtained. A voltage applied between the electrodes of the electrochromic device is calibration ramped. A calibration charging current is measured, charging the electrochromic device through the electrodes of the electrochromic device during the calibration ramping of the voltage. The calibration ramping of the voltage is interrupted, intermittently and temporarily. A calibration open circuit voltage between the electrodes of the electrochromic device is measured during the interruption of the calibration ramping. The calibration ramping of the voltage is stopped when a calibration condition based on the calibration charging current and/or the calibration open circuit voltage is met. A constant main charging/discharging voltage between the electrodes of the electrochromic device is applied. The main charging/discharging voltage is selected in dependence of the ramped voltage when stopped. Any application of a voltage between the electrodes of the electrochromic device is removed when the target colouring level is reached.

In a second aspect, an electrochromic device comprises an electrochromic film and a charge control arrangement. The electrochromic film comprises two electrodes. The electrochromic film presents a transmittance that is dependent on a charge of the electrochromic film. The charge control arrangement is configured to control a voltage applied between the electrodes. The charge control arrangement has an input configured for obtaining a target colouring level, a voltage meter configured to measure an open circuit voltage between said electrodes, and a current meter configured to measure a charging current, charging the electrochromic film through the electrodes. The charge control arrangement is configured for obtaining a measure of an initial colouring level and for obtaining a measure of an initial open circuit voltage between the electrodes of the electrochromic device. The charge control arrangement is configured for causing a calibration ramping of a voltage applied between the electrodes of the electrochromic device. The charge control arrangement is configured for measuring a calibration charging current during the calibration ramping of the voltage. The charge control arrangement is configured for interrupting, intermittently and temporarily, the calibration ramping of the voltage. The charge control arrangement is configured for measuring a calibration open circuit voltage between the electrodes during the interrupting of the calibration ramping. The charge control arrangement is configured for stopping the calibration ramping of the voltage when a calibration condition based on the calibration charging current and/or the calibration open circuit voltage is met. The charge control arrangement is configured for applying a constant main charging/discharging voltage between electrodes of the electrochromic device. The charging/discharging voltage is thereby selected in dependence of the ramped voltage when stopped. The charge control arrangement is configured for removing any application of a voltage between the electrodes of the electrochromic device when the target colouring level is reached.

One advantage with the presently presented technology is that by use of only electrically measures, which are available by the charging/discharging equipment, a well-suited main charging/discharging voltage can easily be obtained for various sizes, ages, temperatures and/or configurations of the electrochromic device.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
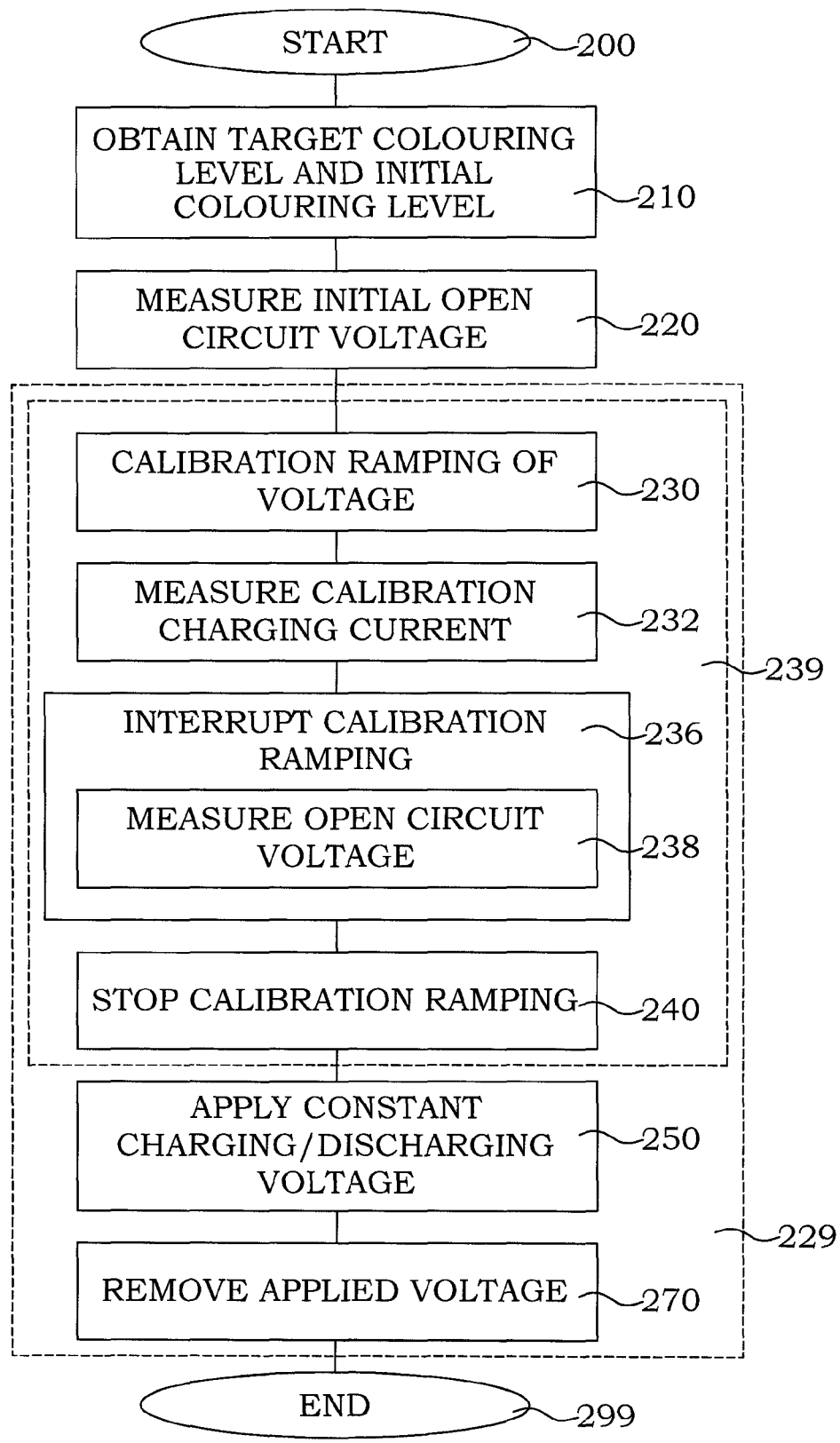
FIG. 1 is flow diagram of steps of an embodiment of a method for controlling an electrochromic device.

Throughout the drawings, the same reference numbers are used for similar or corresponding elements.

The proposed technology is primarily based on the insight that it would be of benefit not to have to rely on any external sensors at all and instead only rely on the electric behaviour of the electrochromic film and the power supply arrangement. Measurements of electrical quantities are relatively easy to implement in a robust manner. By monitoring only a charge density of the electrochromic film (which e.g. can be computed from integration of measurements of charging current) and the open circuit voltage, there is a possibility to control the charge operations in a favourable manner independent on ageing or temperature changes. The open circuit voltage is in the present disclosure defined as the voltage between the two sides of the electrochromic device when no external voltage is applied. Besides the selected measured electrical quantities, for making it easy to apply the ideas on different applications, the control algorithm only uses very few device parameters. Such control can thus to be applicable to basically all types of windows. The configuration parameters are preferably the geometrical size of the window (height and width), the maximum charge, and the voltages being defined as corresponding to "maximum light" and "maximum dark", respectively.

The present technology is applicable on most prior art electrochromic films, where the electrochromic film presents a transmittance that is dependent on a charge of the electrochromic film. Typically, the electrochromic film comprises two electrodes used for controlling the charging and discharging of the electrochromic film. Preferably, the electrochromic film has a low degree of leak currents, assuring that the degree of charging is essentially constant during longer time periods also if no surveillance of the charging state is performed.

In the description below, a model system is used for illustrating the present technology ideas. However, as indicated above, the ideas can also be applied to other types of electrochromic devices. In the model system, the electrochromic device comprises an electrochromic layered structure, having a first substrate sheet, a second substrate sheet, a first electron conducting layer at least partially covering said first substrate sheet, a second electron conducting layer at least partially covering said second substrate sheet, an electrochromic layer at least partially covering said first electron conducting layer, a counter electrode layer at least partially covering said second electron conducting layer, and an electrolyte layer laminated between and at least partially covering said first electrochromic layer and said counter electrode layer. In this model system, the electrodes constitute, or are directly electrically connected to, the first and second electron conducting layers, respectively.

One way to present the present technology is to utilize a view of different states of an electrochromic device. When an electrochromic film is kept under unchanged condition, this state is denoted an idle state. In this state, the control mechanism just checks that the open circuit voltage doesn't change. If there is a drift in the voltage, the control mechanism just corrects for this drift by minor charging or discharging operations. When a change of transparency is requested, the electrochromic device is changed into a charging state. This charging state can in turn comprise a number of substates. According to the basic technology presented herein, at least two substates can be defined. In a first substate, a calibration state, relatively gentle charging is performed while monitoring the responses on charge and open circuit voltage to different charging voltages. From this monitoring, suitable conditions for the main charging operation are deduced. Since the main charging, according to the present technology, is performed with a constant charging voltage, the main charging is here denoted at the static state. In preferred embodiments, a trickle state, in which the final adjustment of a charging operation is made is defined as a substate of the charging state. An initiation state can also be defined. The electrochromic film is then put into well-defined conditions, typically fully discharged. A measures of a total charge of the electrochromic film is then set to a predefined value, typically zero.

Note that in general, the ideas presented herein are applicable to both charging and discharging if not explicitly mentioned. The person skilled in the art realises easily that the word "charging" should be understood as "charging/discharging" in most situations, i.e. charging in a positive or negative direction. In particular, a discharging of the electrochromic device may take place during the charging state.

FIG. 1 illustrates a flow diagram of steps of an embodiment of a method for controlling an electrochromic device. The electrochromic device is a device that presents a transmittance that is dependent on a charge of the electrochromic device. The method starts in step 200. In step 210, a target colouring level and a measure of an initial colouring level are obtained. The target colouring level is a representation of the requested colouring level. Such a request can be entered at any time, i.e. when the electrochromic device is in any of the states. A request for a new target transmittance can thus be ordered if the electrochromic device is present in the idle state as well as if the electrochromic device is in any substate of the charging state, or in the initiation state. The initial colouring level is consequently typically the result of a previous charging or discharging event or the operation of placing the electrochromic device into the initiation state, if the previous charging/discharging has been completed. The initial colouring level may however also be the present colouring level of an ongoing charging/discharging process.

Typically, the target colouring level is represented by a percentage value, where 100% corresponds to a fully charged condition and 0% corresponds to a fully discharged condition, which in turn typically corresponds to a maximum colouring and a fully bleaching, respectively, of the electrochromic device. Such a measure will then denote some kind of colour percentage. In other words, the step of obtaining 210 a target colouring level preferably comprises obtaining of a target colour percentage. The target colour percentage is a difference between the target colouring level and the maximum light condition, expressed as a percentage of the difference between the maximum dark and the maximum light conditions.

However, as the person skilled in the art realizes, the target colouring level could be expressed in any kind of scale. For instance, the actual transmittance may also be utilized. Since the colouring and bleaching of an electrochromic device never reaches the entire way to transmittance 0 or 1, respectively, such transmittance values may also be associated to colour percentage, e.g. by a mathematical function or a table.

In step 220, a measure of an initial open circuit voltage between electrodes of the electrochromic device is obtained. This initial open circuit voltage is consequently typically the result of a latest previous measurement of the open circuit voltage, typically after a previous charging/discharging has been completed. The initial open circuit voltage may however also be the present open circuit voltage of an ongoing charging/discharging process.

The electrochromic device is now ready to enter the charging state 229, and initially the calibration substate 239. In step 230, a calibration ramping is performed, ramping a voltage applied between electrodes of the electrochromic device. The ramping of the voltage goes from a start voltage value that is known to be non-damaging for the electrochromic device, towards voltages that are expected to be close to optimum or at least suitable charging voltages. For a charging action, the voltages are successively increased, causing an increasing charge of the electrochromic device. For a discharging, the voltages are successively decreased, causing a decreasing charge of the electrochromic device.

In a particular embodiment, the calibration ramping starts from the initial open circuit voltage or from a predetermined voltage. The initial open circuit voltage is typically the most "safe" choice of starting value for the ramping, since it already is present at the electrochromic device and the risk of applying voltages of damaging magnitudes are virtually zero. However, if the requested change in colouring is large, such a starting point may cause the calibration procedure to take unnecessary long time. In such cases, a predetermined voltage is an attractive alternative. In a preferred embodiment, the calibration ramping is selected to be started from the initial open circuit voltage or from a predetermined voltage in dependence of a relation between the target colouring level and the initial colouring level. In other words, the staring value is adapted to the particular situation. If a small change in transmittance is requested, the initial open circuit voltage operates well as a start value. If a large change in transmittance is requested, standard starting values may instead be a better choice. Also the particular rang of transmittance that the ramping is intended to pass may be of importance. If a relatively large change is requested, but the initial open circuit voltage is closer to the expected final value than the predetermined voltage, the initial open circuit voltage would anyway be the better choice. In particular embodiments, there may also be a set of predetermined voltages possible to select in dependence of the relation between the target colouring level and the initial colouring level.

In step 232, a calibration charging current is measured. The calibration charging current charges the electrochromic device through the electrodes of the electrochromic device during the calibration ramping of the voltage. The charging current corresponds to a change of the charge of the electrochromic device.

In step 236, the calibration ramping of the voltage is interrupted, intermittently and temporarily. During the interrupting 236 of the calibration ramping, as illustrated by the step 238, a calibration open circuit voltage between the electrodes of the electrochromic device is measured.

The evolution of the charging current, or therefrom deducible quantities, such as the charge of the electrochromic device, and of the open circuit voltage, reveals details of the charging conditions of the electrochromic device. As mentioned above, differences in e.g. temperature or age may alter the charging behaviour. However, from the relation between the calibration charging current and/or the calibration open circuit voltage and the voltage ramping, such differences can be compensated for. Also, if the electrochromic layers of the electrochromic device are connected in different ways for different applications of units, differences in e.g. connecting cable lengths, i.e. differences in inner resistances, may influence the charging conditions. However, by monitoring the behaviour during the calibration ramping, suitable charging conditions can anyway be found without need for any individual pre-calibration of each individual unit.

A suitable charging voltage is decided to be present when a predetermined calibration condition is met. Therefore, in step 240, the calibration ramping of the voltage is stopped when a calibration condition based on the calibration charging current and/or the calibration open circuit voltage is met.

The electrochromic device is now ready to enter the steady substate of the charging state 229. In step 250, a constant main charging/discharging voltage is applied between the electrodes of the electrochromic device. The main charging/discharging voltage is thereby selected in dependence of the ramped voltage when stopped. Due to the information obtained during the calibration ramping, the now selected main charging/discharging voltage can now be set to compensate for variations in configuration, temperature, age, etc. In a particular embodiment, the main charging/discharging voltage is selected to be equal to the ramped voltage when stopped.

In step 270, when the target colouring level is reached, any application of a voltage between the electrodes of the electrochromic device is removed. The procedure ends in step 299

As mentioned above, a quantity that is directly measurable in the system of the electrochromic device is the charging current. However, a more relevant measure for the purpose of discussing transmittance is the device charge. Fortunately, the device charge is easily obtained from the charging current by an integration operation. Starting from a known charge condition, the present charge of the electrochromic device is obtained by integrating the charging current into a calibration charge change and adding the calibration charge change to the known device charge condition. The known charge condition could e.g. be a fully discharged condition, typically the fully light condition corresponding to the maximum transmittance. Such a condition can be determined by allowing the electrochromic device to discharge for a time long enough to ensure that any remaining device charge is removed. The integration procedure is then initiated, keeping track on any charge added to the device. The process of obtaining a fully discharged condition is time consuming and is not practical to perform for each instance when a change in transmittance is requested. For a typical procedure for changing the transmittance, the known charge condition is instead set to the end charge condition of the previous transmittance change procedure. The process of obtaining a fully discharged condition can then be performed occasionally to ensure that non-measured leak currents do not influence the estimated charge condition.

Figure 2:
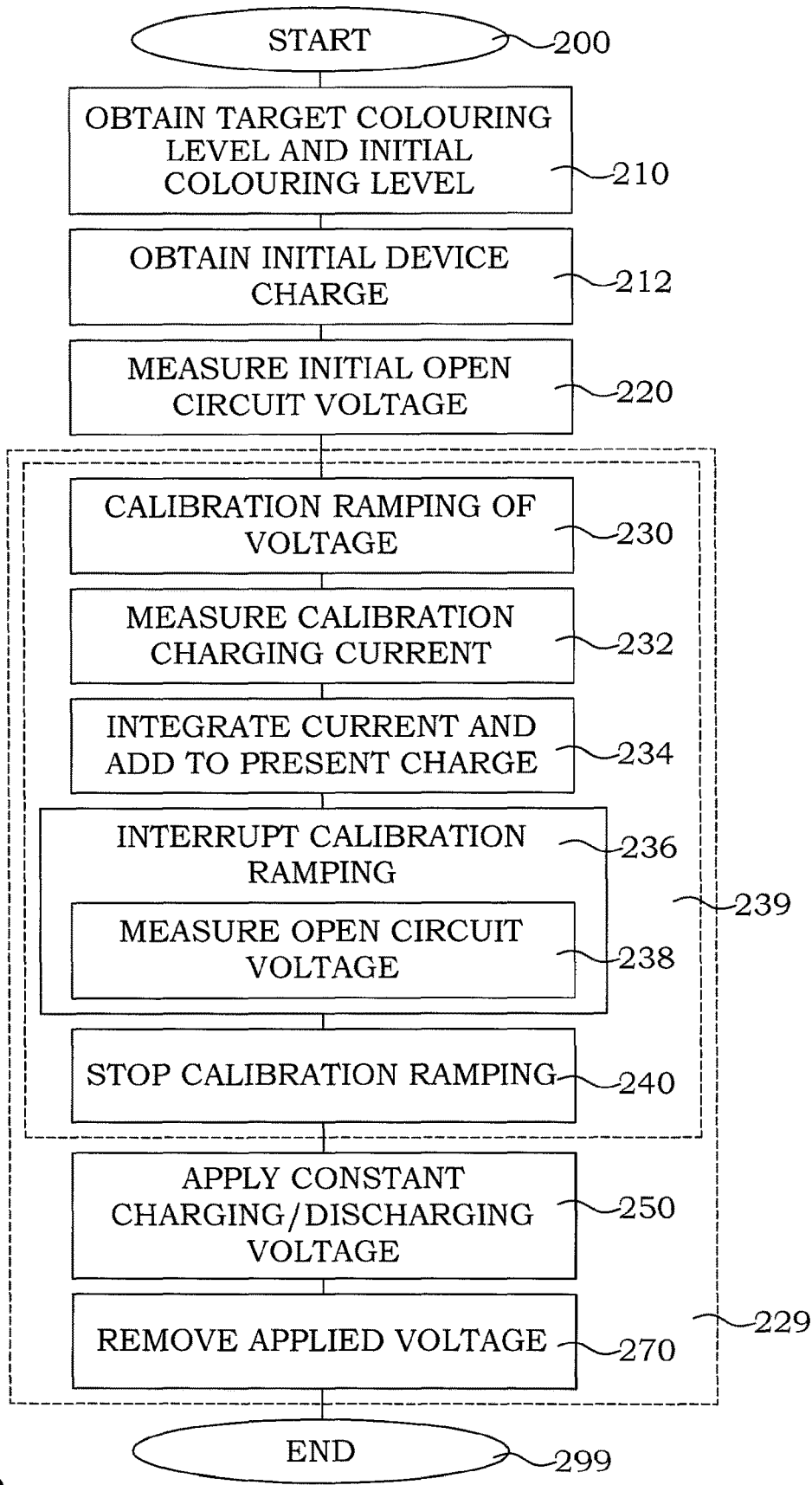
FIG. 2 is flow diagram of steps of another embodiment of a method for controlling an electrochromic device.

FIG. 2 illustrates a flow diagram of steps of another embodiment of a method for controlling an electrochromic device. Most steps are the same as presented in FIG. 1 and will not be generally discussed again. In step 212, measures of an initial device charge is obtained. As mentioned above, this initial device charge is typically the end charge condition of the previous transmittance change procedure, but may also be any other measure of the present device charge.

In step 234, the measured calibration charging current is integrating into a calibration charge change and the calibration charge change is added to the initial device charge, which gives a present device charge. The calibration condition used in step 240 may then be based on the present device charge. In other words, the calibration condition is preferably a comparison between the calibration open circuit voltage and/or the present device charge with ramping thresholds.

In other words, when a change of transmittance is requested, a target colouring level is given by an operator or an external surveillance system. Such a request of a change can occur at any instant. If a charging is to be performed, the control algorithm then starts to ramp up the applied voltage. The charging current is measured and integrated into a charge density change, which combined with the initial device charge. Intermittently, the charging is interrupted, e.g. once every second, for a very short time and the open circuit voltage is measured. When certain calibration conditions are obtained, based on the measured charge density and/or open circuit voltage, optimum or at least sufficiently good charging conditions are considered to be found.

The calibration conditions are, however, dependent on the actual device that is to be controlled. The current necessary for obtaining a certain change in transmittance is dependent e.g. on the size of the electrochromic device. Fortunately, the parameters that are of importance for finding a operable calibration condition are device parameters, which are known or easily measured. Thus, the thresholds used in step 240 are therefore preferably determined only from device parameters and the measures of the initial device charge, the initial open circuit voltage and the initial colouring level.

In a preferred embodiment, the device parameters are size of the electrochromically active area, a maximum charge and voltages defined to correspond to maximum light and maximum dark, respectively. In an alternative embodiment, the device parameters are parameters derivable from the size of electrochromically active area, a maximum charge and voltages defined to correspond to maximum light and maximum dark, respectively. In yet another embodiment, the device parameters are parameters from which the size of electrochromically active area, a maximum charge and voltages defined to correspond to maximum light and maximum dark, respectively, can be derived. In further embodiments, combinations of these three approaches are used.

Since the charging conditions may change with temperature and/or age and/or configuration of the device, the applied voltage settings of the optimum charging conditions may vary. In a typical case, it is of benefit if the intended charging voltage for a static state is relatively large, since this typically increases the charging speed. However, the charging voltage for a static state cannot be too high without damaging the device. Similarly, if a reasonable fast charging is obtained by a lower voltage, a decrease in charging voltage will typically always improve the total life of an electrochromic device.

In one particular embodiment, the calibration conditions is divided into three parts. The calibration conditions for charging is said to be met if any of the following three part conditions is true. The first part condition is if the calibration open circuit voltage is larger than a first ramping threshold $k1$. The second part condition is if the present device charge is larger than a second ramping threshold $k2$. The third part condition is if the calibration open circuit voltage is larger than a third ramping threshold $k3$ at the same time as the present device charge is larger than a fourth ramping threshold $k4$. $k1$-$k4$ are thus the ramping thresholds and $k1>k3$ and $k2>k4$. The constants $k1$-$k4$ are typically determined only from the device parameters and from the measures of the initial device charge, the initial open circuit voltage and the initial colouring level.

Analogously for a discharging operation, the calibration conditions for discharging is said to be met if any of the following three part conditions is true. The first part condition is if the calibration open circuit voltage is smaller than a fifth ramping threshold $k5$. The second part condition is if the present device charge is smaller than a sixth ramping threshold $k6$. The third part condition is if the calibration open circuit voltage is smaller than a seventh ramping threshold $k7$ at the same time as the present device charge is smaller than an eighth ramping threshold k8. k5-k8 are thus the ramping thresholds and k7>k5 and k8>k6.

In other words, the typical scenario is that, during charging, the applied voltage should be above a certain level at the same time as the device charge also is above a certain level. However, if the conditions or configurations are such that either of these numbers are not achievable by reasonable settings, there are security levels for the separate parameters, i.e. either that the voltage becomes too high or the device charge becomes too high. When the calibration conditions are met, the control algorithm turns over to a "static state". The procedures in the following substates are dependent on that the procedures in the calibration state were performed well. At higher temperatures, the charging process is easier, and the static voltage needed for a sufficient charging rate is relatively low. For lower temperatures, the charging processes are slowed down, and a higher static voltage can be used. At such low temperatures, the risk for overheating is smaller. Also, when a device ages, the charging may become more difficult to perform, and higher static voltage may be necessary. The initial ramping is performed, and the "easiness" of charging is thereby tested or calibrated. From this calibration, a suitable static voltage is selected, which will be adapted to the present temperature/age, without any need for direct temperature or transmittance measurements.

Figure 3:
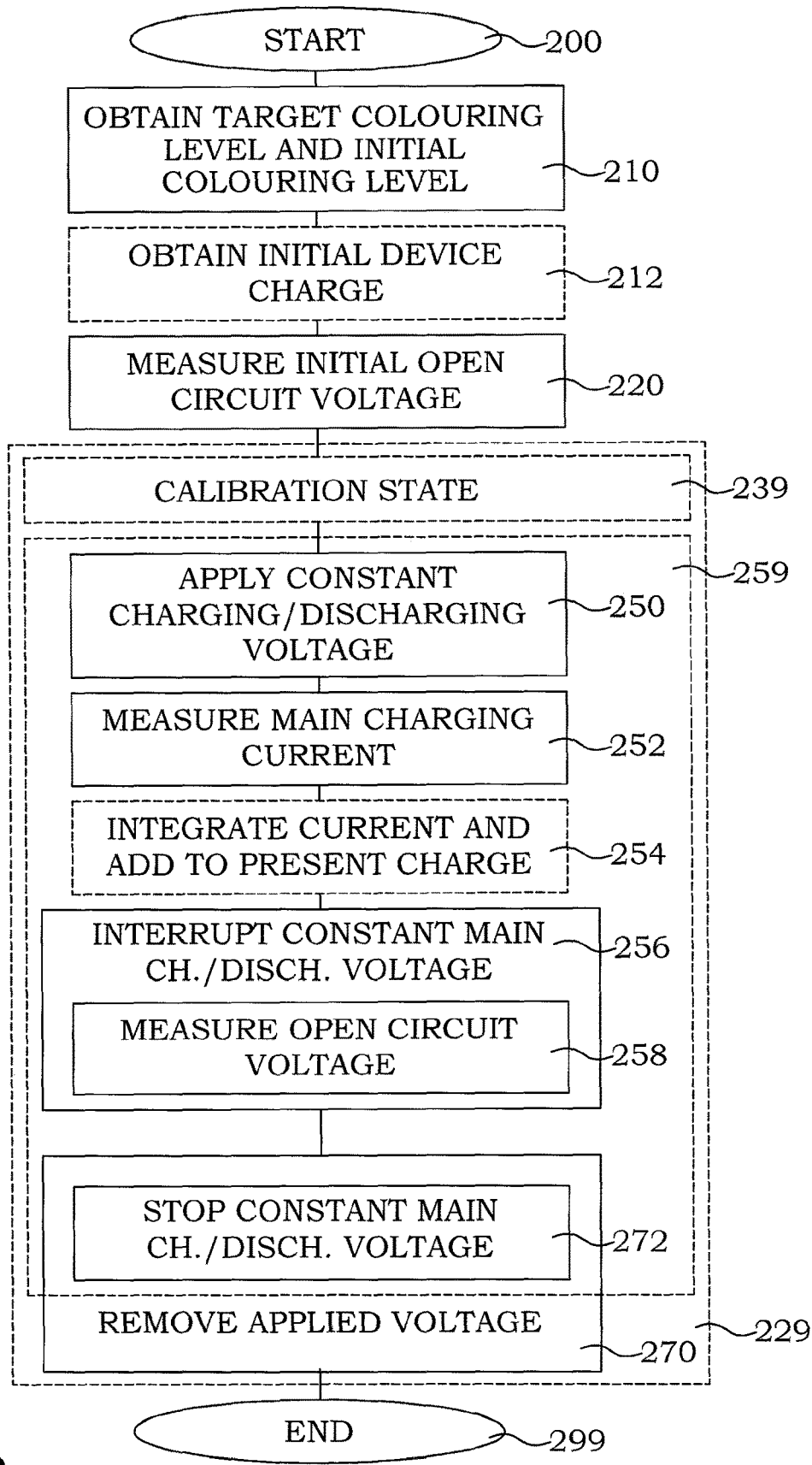
FIG. 3 is flow diagram of steps of yet another embodiment of a method for controlling an electrochromic device.

When the calibration substate has been ended, there is a preferred static voltage, with which the main charging is intended to be performed. There are many possible procedures to use for arriving to the intended transmittance level. One embodiment of a method for controlling an electrochromic device, illustrated in FIG. 3 utilizes in a static state 259 measures of charging currents and open circuit voltages in order to reach a requested final condition. In step 252, a main charging current is measured. The main charging current charges the electrochromic device through the electrodes of the electrochromic device during the time when the constant main charging/discharging voltage is applied. In step 256, the application of the constant main charging/discharging voltage is interrupted, intermittently and temporarily. In step 258, during the interruption of the application of the constant main charging/discharging voltage, a main open circuit voltage between the electrodes of the electrochromic device is measured. In step 272, the application of the constant main charging/discharging voltage is stopped when a main stop condition based on the main charging current and/or the main open circuit voltage is met.

In analogy with different embodiments described above, in a particular embodiment, the method comprises a further step. In step 254, the measured main charging current is integrated into a main charge change and the present device charge is updated by the main charge change. The main stop condition of step 272 then preferably comprises a comparison between the main open circuit voltage and/or the present device charge with main thresholds. These thresholds are preferably determined only from device parameters and the measures of the initial device charge, the initial open circuit voltage and the initial colouring level.

In further analogy with the charging substate described above, also the thresholds for the main static substate can be configured in a similar way. Therefore, in a particular embodiment, the main stop conditions for charging is met if any of the following three conditions is true. The first part condition is if the main open circuit voltage is larger than a first main threshold k9. The second part condition is if the present device charge is larger than a second main threshold k10. The third part condition is if the calibration open circuit voltage is larger than a third main threshold k11 at the same time as the present device charge is larger than a fourth main threshold k12. k9-k12 are thus the main thresholds and k9>k11 and k10>k12.

Analogously for a discharging operation, the main stop conditions for discharging is said to be met if any of the following three part conditions is true. The first part condition is if the main open circuit voltage is smaller than a fifth main threshold k13. The second part condition is if the present device charge is smaller than a sixth main threshold k14. The third part condition is if the calibration open circuit voltage is smaller than a seventh main threshold k15 at the same time as the present device charge is smaller than an eighth main threshold k16. k13-k16 are thus the main thresholds and k15>k13 and k16>k14.

In the case of requesting a fully discharged electrochromic device, an additional or alternative condition can be used. Since a fully discharged electrochromic device is defined as a device having no remaining charge, the main stop condition for discharging to a fully discharged state can be said to be met if the main charge change is smaller than a predetermined threshold. In other words, when no current flows to or from the electrodes, the electrochromic device is without charge.

Figure 4:
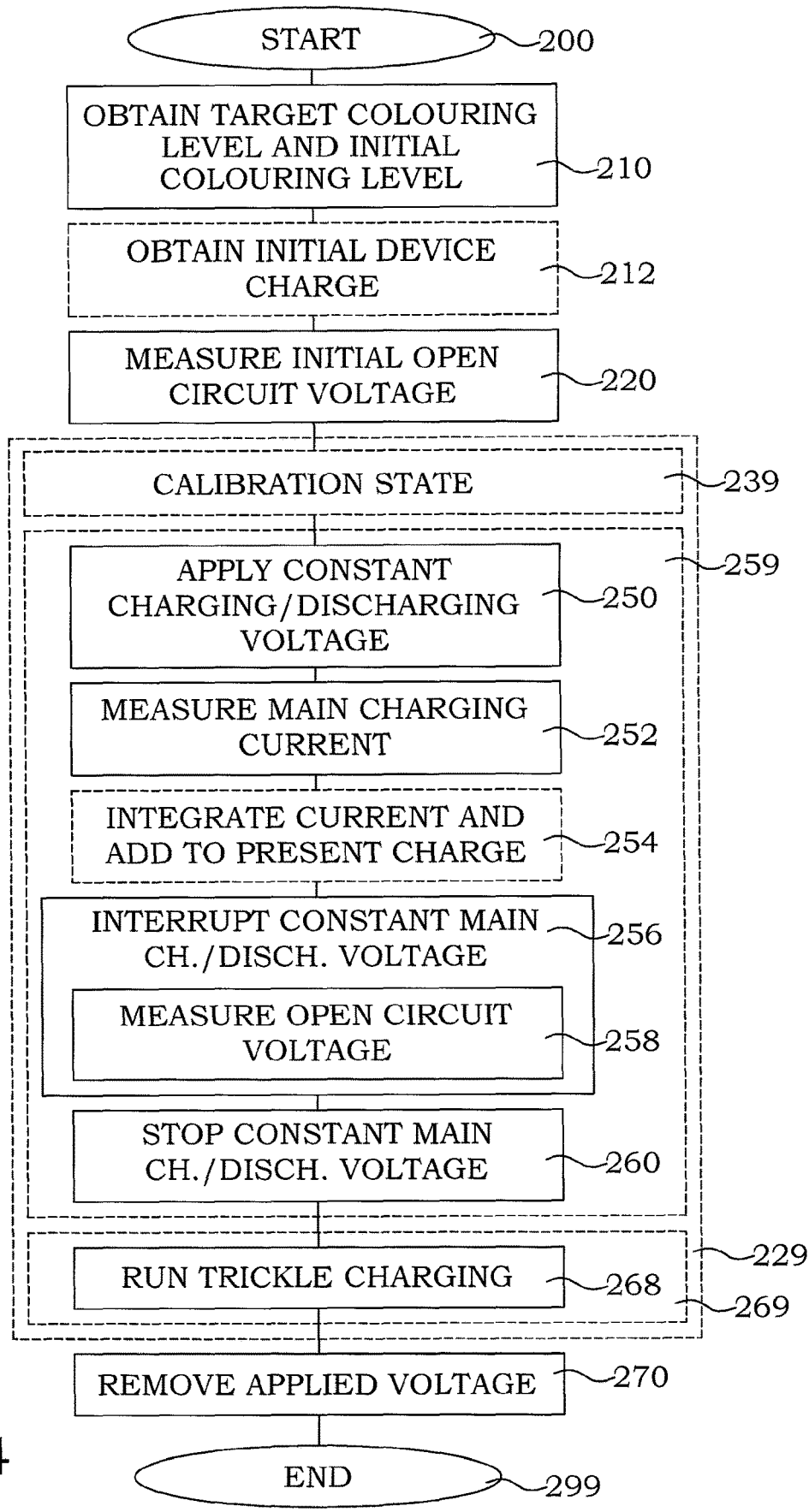
FIG. 4 is flow diagram of steps of yet another embodiment of a method for controlling an electrochromic device.

When coming closer to the intended final transmittance condition, the static state operation might be experienced as a somewhat coarse charging method. In a particular embodiment, illustrated in FIG. 4, an additional trickle substate 269 is introduced in the charging state. The application of the constant main charging/discharging voltage is stopped in step 260 when a main stop condition based on the main charging current and/or the main open circuit voltage is met. This step corresponds to step 272 in FIG. 3. However, the stopping of the constant main charging/discharging voltage is here instead followed by the trickle substate 269. In step 268, a trickle charging is run when the applying of the constant main charging/discharging voltage is stopped. The trickle charging continues until the target colouring level is reached. When such a target colouring level is reached, the voltage removal of step 270 is performed.

Trickle has the general meaning of allowing small portions of something to pass. In the trickle state, the charge of the electrochromic device is increased, if a charging is requested, or decreased, if a discharging is requested, in small amounts, to slowly approach the final transmittance. Measurements of the charge, leading to a present device charge as well as of the open circuit voltage may continue also during this substate. In other words, the charging/discharging process is allowed to slow down when the final transmittance is approached. This is of particular benefit if extremely low transmittances are requested, corresponding to relatively high voltages across the electrochromic device.

The actual voltages applied to the electrochromic device may be found in many different ways, since the time aspect is of less importance when the transmittance is almost at its final value. In one preferred embodiment, the voltages applied between the electrodes of the electrochromic device during the trickle charging are determined directly or indirectly based on device parameters and the measures of the initial device charge, the initial open circuit voltage and the initial colouring level.

In the embodiments presented above, using the thresholds k1-k16, the thresholds k1-k16 may be determined in different ways. One straight-forward option is trial-and-error, where initially estimated thresholds are successively adapted by evaluating test charging/discharging. Another straight-forward way is simply manual determination of the thresholds based on operational experience.

A more elaborate approach to determine suitable thresholds is to perform charging/discharging, accompanied by measurement of open circuit voltage and charging current as well as by measurements of applied voltage and transmittance. By performing simultaneous measurements of transmittance, open circuit voltage and charging current, the thresholds k1-k16 can be considered as an association of various transmittance behaviour with the behaviours of the open circuit voltage and charging current. There are no actual transmittance measurements performed in the operation procedures, but information about transmittance are anyway utilized indirectly, through the thresholds.

The determination of the thresholds k1-k16 thereby translates transmittance properties into a limited number of parameters associated with easily measured electrical properties. Most of these parameters are to a large extent independent of shapes and sizes of the products, or directly proportional thereto. By making a first extensive investigation of suitable parameters, possible dependencies on size and/or shape may be picked up. For later use on similar types of devices, only limited adaptations have typically to be performed. If more fundamental changes are introduced, such as e.g. large changes in transparent conductivity, contact resistances, positioning of conducting leads and different electrochromic materials, new initial test may be recommended. Otherwise, for smaller modifications, only some more prominent parameters, such as maximum open circuit voltage, the maximum device charge and/or the minimum open circuit voltage, may be slightly adapted.

The first time this determination is made, it is preferably performed on a variety of sizes and shapes, which may be used for the final products. In such a way, any dependences on e.g. distance between conduction paths or any shape dependencies can be indirectly incorporated into the thresholds values. The transmittance is measured at at least one position. Preferably, at least one of these transmittance measurements are performed at a location where the transmission change is assumed to be the fastest, i.e. typically close to a conductor path.

In one particular embodiment, test charging/discharging is performed at different surrounding temperatures. Preferably, the test charging/discharging is performed at the lowest $T_L$ and highest $T_H$ intended operation temperature and at an intermediate temperature $T_M$. First a voltage ramping for a charging process is performed for the three different temperatures up to a predetermined static charging voltage. This static charging voltage is typically set by experience to a reasonable ideal static charge voltage that is not hazardous for the device but anyway gives a sufficiently rapid charging at "normal" conditions for the different temperatures. When the ramping reaches this predetermined static charging voltage, the measured values of the open circuit voltage and device charge, as deduced from the measured charging current, are noted, for each temperature. The open circuit voltage measured for the temperature $T_L$ is used as the k1 threshold, and the device charge is used as the k4 threshold. The open circuit voltage measured for the temperature $T_M$ is used as the k3 threshold. Finally, the device charge for the temperature $T_H$ is used as the k2 threshold.

A continuing static voltage charging, using the predetermined static charging voltage is then performed at the three temperatures. This static voltage charging is stopped when a predetermined transmittance is reached. This predetermined transmittance is typically set a few percent above a minimum obtainable transmittance, in a particular embodiment 4% above the minimum obtainable transmittance. At this breaking of the static voltage charging, the measured values of the open circuit voltage and device charge, as deduced from the measured charging current, are noted, for each temperature. The open circuit voltage measured for the temperature $T_L$ is used as the k9 threshold, and the device charge is used as the k12 threshold. The open circuit voltage measured for the temperature $T_M$ is used as the k11 threshold. Finally, the device charge for the temperature $T_H$ is used as the k10 threshold.

A "trickle" procedure is then applied to reach the minimum transmission. In a preferred embodiment, the trickle procedure is operated during 2 hours for the temperature $T_H$. When the minimum transmission is reached at the temperature $T_H$, a quantity $u_{100}$ is set to the measured open circuit voltage, and a quantity $q_{100}$ is set to the measured device charge.

In a preferred embodiment, the thresholds k9-12 are expressed in relation to the maximum device charge and maximum open circuit voltage, respectively. How these values preferably are determined are described further below. To this end, the k9 threshold can be set as $k9=k9'+u_{100}$, where $u_{100}$ is the maximum open circuit voltage. Similarly, the k10 threshold can be set as $k10=k10'*q_{100}$, where $q_{100}$ is the maximum device charge. The k11 threshold can be set as $k11=k11'+u_{100}$, and the k12 threshold can be set as $k12=k12'*q_{100}$. If any updating of the thresholds or determining of thresholds for different material qualities is subsequently required, only the maximum device charge and maximum open circuit voltage have to be measured, and new thresholds k9-k12 can be calculated using the factors/terms k9'-k12'.

Similar test runs are preferably performed also for discharging at the temperatures $T_H$, $T_M$ and $T_L$. A ramping of discharging voltage gives in an analogue way the thresholds k5-k8. A discharging by a constant voltage then gives the thresholds k13-k16. Finally, after an extensive time of discharging, a maximum transmittance is assumed to be reached and a quantity $u_0$ is set equal to the measured open circuit voltage. In analogy with above, the thresholds k13-16 can be expressed as $k13=k13'+u_0$, $k14=k14'*q_{100}$, $k15=k15'+u_0$, and $k16=k16'*q_{100}$.

If such test runs are made for a selection of device materials, shapes and sizes, it can easily be concluded how general the thresholds are. In most cases, it will be possible to use the same thresholds for the same material quality and a threshold value is then selected based on a compromise between the different measured values. If the measured threshold values differ too much, e.g. depending on the shape, different threshold values can be used for different groups of shapes. Material quality typically influences the quantities $u_0$, $u_{100}$ and $q_{100}$, but not the relations, i.e. k9'-k16', to the thresholds k9-k16, which means that only measurements of maximum and minimum transmittance becomes required.

Figure 5:
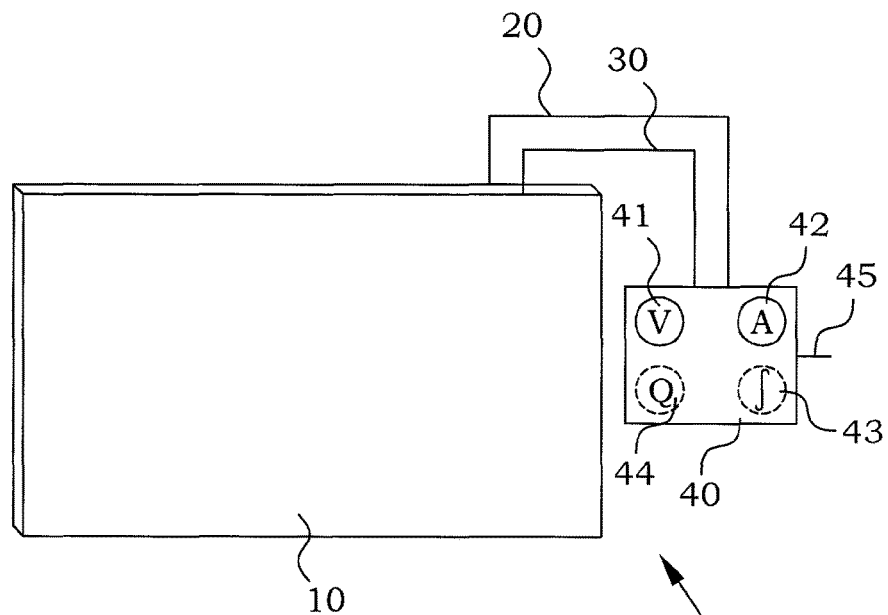
FIG. 5 is a schematic block scheme of parts of an embodiment of an electrochromic device.

FIG. 5 illustrated schematically a block scheme of an embodiment of an electrochromic device 1. The electrochromic device 1 comprises an electrochromic film 10 comprising two electrodes 20, 30. The electrochromic film 10 presents a transmittance that is dependent on a charge of the electrochromic film. The electrochromic device 1 further comprises a charge control arrangement 40. The charge control arrangement 40 is configured to control a voltage applied between the electrodes. The charge control arrangement 40 has an input 45 configured for obtaining a target colouring level. This target colouring level can be provided manually, e.g. by turning a knob or giving a required transmittance level by a keyboard and/or a screen. The target colouring level can in other embodiments be provided automatically, e.g. as a response to different kind of sensors.

The charge control arrangement 40 is capable of measuring voltages, as indicated by the voltage meter 41, and measuring currents, as indicated by the current meter 42. The voltage meter 41 is configured to measure an open circuit voltage between the electrodes 20, 30. The current meter 42 is configured to measure a charging current. The charging current charges the electrochromic film 10 through said electrodes 20, 30. In preferred embodiments, the charge control arrangement 40 is further capable of integrating the measured currents, as indicated by the reference 43, and adding the integrated currents into a charge, as indicated by the reference 44.

The charge control arrangement 40 is generally configured for controlling charging and discharging of the electrochromic film 10. These controlling capabilities can be implemented in hardware using any conventional technology, such as discrete circuit or integrated circuit technology, including both general-purpose electronic circuitry and application-specific circuitry. Particular examples include one or more suitably configured digital signal processors and other known electronic circuits, e.g. discrete logic gates interconnected to perform a specialized function, or Application Specific Integrated Circuits (ASICs).

Alternatively, at least some of the procedures described herein may be implemented in software such as a computer program for execution by suitable processing circuitry such as one or more processors or processing units. The flow diagram or diagrams presented herein may therefore be regarded as a computer flow diagram or diagrams, when performed by one or more processors. Examples of processing circuitry includes, but is not limited to, Digital Signal Processors, Central Processing Units, video acceleration hardware, and/or any suitable programmable logic circuitry such as Field Programmable Gate Arrays or Programmable Logic Controllers. A corresponding apparatus may be defined as a group of function modules, where each step performed by the processor corresponds to a function module. In this case, the function modules are implemented as a computer program running on the processor.

It should also be understood that it may be possible to re-use the general processing capabilities of any conventional device or unit in which the proposed technology is implemented. It may also be possible to re-use existing software, e.g. by reprogramming of the existing software or by adding new software components.

The charge control arrangement 40 is thereby further configured for obtaining a measure of an initial colouring level and for obtaining a measure of an initial open circuit voltage between the electrodes 20, 30 of the electrochromic device 1. The charge control arrangement 40 is also configured for causing a calibration ramping of a voltage applied between the electrodes 20, 30 of the electrochromic device 1. The charge control arrangement 40, and in particular the current meter 42, is configured for measuring a calibration charging current during the calibration ramping of the voltage. The charge control arrangement 40 is further configured for interrupting, intermittently and temporarily, the calibration ramping of the voltage. The charge control arrangement 40, and in particular the voltage meter 41, is configured for measuring a calibration open circuit voltage between the electrodes 20, 30 during the interrupting of the calibration ramping.

The charge control arrangement 40 is configured for stopping the calibration ramping of the voltage when a calibration condition based on the calibration charging current and the calibration open circuit voltage is met. The charge control arrangement 40 is configured for applying a constant main charging/discharging voltage between electrodes 20, 30 of the electrochromic device 1. The charging/discharging voltage is selected in dependence of the ramped voltage when stopped. The charge control arrangement 40 is also configured for removing any application of a voltage between the electrodes 20, 30 of the electrochromic device 1 when the target colouring level is reached.

Figure 6:
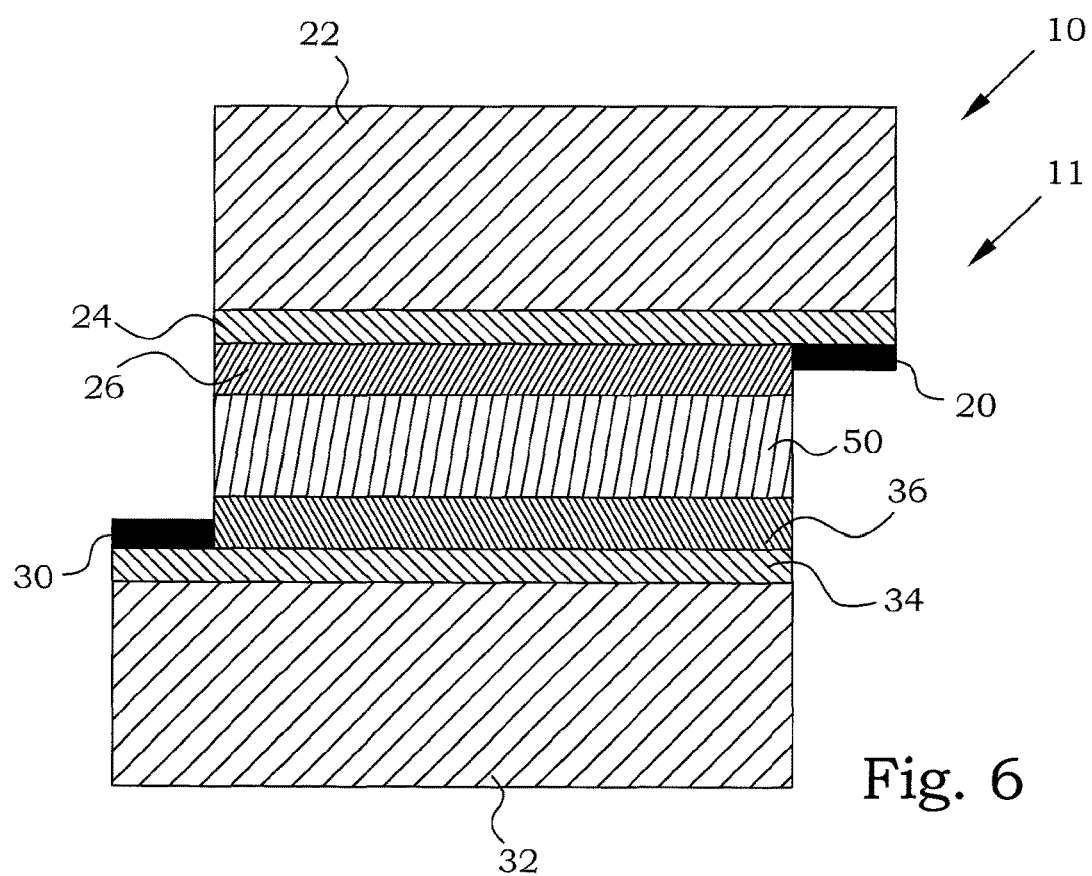
FIG. 6 is a schematic block scheme of parts of an embodiment of an electrochromic film.

FIG. 6 illustrates a schematic illustration of an embodiment of an electrochromic film 10 that by advantage can be used in an electrochromic device according to the technology presented herein. However, other types of electrochromic films 10 are also possible to use. Generally electrochromic layered structures capable of keeping a charge supplied by two electrode connections are candidates. In the embodiment of FIG. 6, in the centre part, an ion conductor, i.e. an electrolyte layer 50 is provided. The electrolyte layer 50 is on one side in contact with an electrochromic layer 26, capable of conducting electrons as well as ions. On the other side of the ion conductor 50 is an electron and ion conducting counter electrode layer 36, serving as an ion storage layer. This counter electrode film 36 may entirely or partly be constituted by a second electrochromic film. The central three-layer structure 26, 36, 50 is positioned between electron conducting layers 24, 34. The electron conducting layers 24, 34 are arranged against outer substrates, in the present embodiment a first 22 and a second 32 substrate, typically plastic substrate. The stack of the substrates 22, 32 and the central five layers 24, 26, 50, 36, 34 forms an electrochromic layered structure 11.

Note that the relative thicknesses of the layers in the different figures in the present disclosure do not represent the true relationship in dimensions. Typically, the substrates are much thicker than the other layers. The figures are drawn only for the purpose to illustrate connection principles, not to give any dimensional information.

Such an electrochromic film 10 is coloured/bleached by applying an external voltage pulse between the electron conducting layers 24, 34 by electrodes 20, 30 on the two sides of the stack, causing the electrons and ions to move between the electrochromic layer 26 and the counter electrode layer 36 and thereby charge the electrochromic film. The electrochromic layer 26 will thereby change its colour. Non-exclusive examples of electrochromic layers 26 are cathodically colouring thin films of oxides based on tungsten, molybdenum, niobium, titanium, lead and/or bismuth, or anodically colouring thin films of oxides, hydroxides and/or oxy-hydrides based on nickel, iridium, iron, chromium, cobalt and/or rhodium.

If plastic substrates are used, a plastic substrate 22, 32 is a synthetic or semisynthetic polymerization product. The plastic substrate is commonly classified by its polymer backbone. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers Non-exclusive examples of electron conductors 24, 34 transparent to visible light are thin films of Indium Tin oxide (ITO), Tin oxide, Zinc oxide, n- or p-doped Zinc oxide and Zinc oxyfluoride. Metal-based layers, such as ZnS/Ag/ZnS and carbon nanotube layers have been recently explored as well.

As mentioned above, a counter electrode layer 36 may comprise electrochromic materials as well as non-electrochromic materials. Non-exclusive examples of counter electrode layers 36 are cathodically colouring electrochromic thin films of oxides based on tungsten, molybdenum, niobium, titanium, lead and/or bismuth, anodically colouring electrochromic thin films of oxides, hydroxides and/or oxyhydrides based on nickel, iridium, iron, chromium, cobalt and/or rhodium, or non-electrochromic thin films e.g. of oxides based on vanadium and/or cerium as well as activated carbon. Also combinations of such materials can be used as a counter electrode layer 36.

The electrolyte layer 50 comprises an ion conductor material. The electrolyte layer 50 may be transparent or non-transparent, coloured or non-coloured, depending on the application. Some non-exclusive examples of electrolyte types are: solid polymer electrolytes (SPE), such as poly (ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of $TiO_2$, silica or other oxides. Some non-exclusive examples of lithium salts used are LiTFSI [lithium bis(trifluoromethane) sulfonimide], $LiBF_4$ [lithium tetrafluoroborate], $LiAsF_6$ [lithium hexafluoro arsenate], $LiCF_3SO_3$ [lithium trifluoromethane sulfonate], and $LiClO_4$ [lithium perchlorate].

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for controlling an electrochromic device, said electrochromic device presenting a transmittance being dependent on a charge of said electrochromic device, said method comprising the steps of:
   obtaining a target colouring level and a measure of an initial colouring level;
   obtaining a measure of an initial open circuit voltage between said electrodes of said electrochromic device;
   calibration ramping of a voltage applied between said electrodes of said electrochromic device;
   measuring a calibration charging current, charging said electrochromic device through said electrodes of said electrochromic device during said calibration ramping of said voltage;
   interrupting, intermittently and temporarily, said calibration ramping of said voltage;
   measuring a calibration open circuit voltage between said electrodes of said electrochromic device during said interrupting of said calibration ramping;
   stopping said calibration ramping of said voltage when a calibration condition based on said calibration charging current and/or said calibration open circuit voltage is met;
   applying a constant main charging/discharging voltage between electrodes of said electrochromic device;
   whereby said main charging/discharging voltage is selected in dependence of said ramped voltage when stopped; and
   removing any application of a voltage between said electrodes of said electrochromic device when said target colouring level is reached.

2. The method according to claim 1, wherein said main charging/discharging voltage is selected to be equal to said ramped voltage when stopped.

3. The method according to claim 2, wherein said calibration ramping starts from said initial open circuit voltage or from a predetermined voltage.

4. The method according to claim 2, comprising the further steps of:
   obtaining measures of an initial device charge;
   integrating said measured calibration charging current into a calibration charge change and adding said calibration charge change to said initial device charge giving a present device charge;
   wherein said calibration condition is a comparison between at least one of said calibration open circuit voltage and said present device charge with ramping thresholds determined only from device parameters and said measures of said initial device charge, said initial open circuit voltage and said initial colouring level.

5. The method according to claim 1, wherein said calibration ramping starts from said initial open circuit voltage or from a predetermined voltage.

6. The method according to claim 5, wherein said calibration ramping is selected to be started from said initial open circuit voltage or from a predetermined voltage in dependence of a relation between said target colouring level and said initial colouring level.

7. The method according to claim 6, comprising the further steps of:
   obtaining measures of an initial device charge;
   integrating said measured calibration charging current into a calibration charge change and adding said calibration charge change to said initial device charge giving a present device charge;
   wherein said calibration condition is a comparison between at least one of said calibration open circuit voltage and said present device charge with ramping thresholds determined only from device parameters and said measures of said initial device charge, said initial open circuit voltage and said initial colouring level.

8. The method according to claim 5, comprising the further steps of:
   obtaining measures of an initial device charge;
   integrating said measured calibration charging current into a calibration charge change and adding said calibration charge change to said initial device charge giving a present device charge;
   wherein said calibration condition is a comparison between at least one of said calibration open circuit voltage and said present device charge with ramping thresholds determined only from device parameters and said measures of said initial device charge, said initial open circuit voltage and said initial colouring level.

9. The method according to claim 1, comprising the further steps of:
   obtaining measures of an initial device charge;
   integrating said measured calibration charging current into a calibration charge change and adding said calibration charge change to said initial device charge giving a present device charge;
   wherein said calibration condition is a comparison between at least one of said calibration open circuit voltage and said present device charge with ramping thresholds determined only from device parameters and said measures of said initial device charge, said initial open circuit voltage and said initial colouring level.

10. The method according to claim 9, wherein said calibration conditions for charging is met if any of the following is true:
   calibration open circuit voltage >k1
   present device charge >k2
   calibration open circuit voltage >k3 and present device charge >k4
where k1-k4 are said ramping thresholds and k1>k3 and k2>k4, and in that said calibration conditions for discharging is met if any of the following is true:
   calibration open circuit voltage <k5
   present device charge <k6
   calibration open circuit voltage <k7 and present device charge <k8
where k5-k8 are said ramping thresholds and k7>k5 and k8>k6.

11. The method according to claim 9, wherein said device parameters being size of electrochromically active area, a maximum charge and voltages defined to correspond to maximum light and maximum dark, respectively, or parameters derivable from size of electrochromically active area, a maximum charge and voltages defined to correspond to maximum light and maximum dark, respectively, or parameters from which size of electrochromically active area, a maximum charge and voltages defined to correspond to maximum light and maximum dark, respectively, can be derived, or combinations thereof.

12. The method according to claim 1, wherein said step of obtaining a target colouring level comprises obtaining of a target colour percentage, being a difference between said target colouring level and said maximum light condition, expressed as a percentage of the difference between said maximum dark and said maximum light conditions.

13. The method according to claim 1, comprising the further steps of:
   measuring a main charging current, charging said electrochromic device through said electrodes of said electrochromic device during said applying of said constant main charging/discharging voltage;
   interrupting, intermittently and temporarily, said applying of said constant main charging/discharging voltage;
   measuring a main open circuit voltage between said electrodes of said electrochromic device during said interrupting of said applying of said constant main charging/discharging voltage;
   stopping said applying of said constant main charging/discharging voltage when a main stop condition based on said main charging current and/or said main open circuit voltage is met.

14. The method according to claim 13, comprising the further steps of:
   integrating said measured main charging current into a main charge change and updating said present device charge by said main charge change;
   wherein said main stop condition comprises a comparison between at least one of said main open circuit voltage and said present device charge with main thresholds determined only from device parameters and said measures of said initial device charge, said initial open circuit voltage and said initial colouring level.

15. The method according to claim 14, wherein said main stop conditions for charging is met if any of the following is true:
   main open circuit voltage >k9
   present device charge >k10
   main open circuit voltage >k11 and present device charge >k12
where k9-k12 are said main thresholds and k9>k11 and k10>k12, and in that said main conditions for discharging is met if any of the following is true:
   main open circuit voltage <k13
   present device charge <k14
   main open circuit voltage <k15 and present device charge <k16
where k13-k16 are said main thresholds and k15>k13 and k16>k14.

16. The method according to claim 14, wherein said main stop conditions for discharging to a fully discharged state is met if said main charge change is smaller than a predetermined threshold.

17. The method according to claim 13, comprising the further step of:
   running a trickle charging when said applying of said constant main charging/discharging voltage is stopped, until said target colouring level is reached.

18. The method according to claim 17, wherein voltages applied between said electrodes of said electrochromic device during said trickle charging are determined directly or indirectly based on device parameters and said measures of said initial device charge, said initial open circuit voltage and said initial colouring level.

19. The method according to claim 3, wherein said calibration ramping is selected to be started from said initial open circuit voltage or from a predetermined voltage in dependence of a relation between said target colouring level and said initial colouring level.

20. An electrochromic device, comprising:
   an electrochromic film comprising two electrodes;
   said electrochromic film presenting a transmittance being dependent on a charge of said electrochromic film; and
   a charge control arrangement configured to control a voltage applied between said electrodes;
   said charge control arrangement having an input configured for obtaining a target colouring level, a voltage meter configured to measure an open circuit voltage between said electrodes, and a current meter configured to measure a charging current, charging said electrochromic film through said electrodes;
   said charge control arrangement being configured for obtaining a measure of an initial colouring level and for obtaining a measure of an initial open circuit voltage between said electrodes of said electrochromic device;
   said charge control arrangement being configured for causing a calibration ramping of a voltage applied between said electrodes of said electrochromic device;
   said charge control arrangement being configured for measuring a calibration charging current during said calibration ramping of said voltage;
   said charge control arrangement being configured for interrupting, intermittently and temporarily, said calibration ramping of said voltage;
   said charge control arrangement being configured for measuring a calibration open circuit voltage between said electrodes during said interrupting of said calibration ramping;
   said charge control arrangement being configured for stopping said calibration ramping of said voltage when a calibration condition based on said calibration charging current and/or said calibration open circuit voltage is met;

said charge control arrangement being configured for applying a constant main charging/discharging voltage between said electrodes of said electrochromic device;

whereby said charging/discharging voltage is selected in dependence of said ramped voltage when stopped; and said charge control arrangement being configured for removing any application of a voltage between said electrodes of said electrochromic device when said target colouring level is reached.

* * * * *

UNITED STATES PATENT AND TRADEMARK OFFICE
CERTIFICATE OF CORRECTION

PATENT NO. : 10,649,300 B2
APPLICATION NO. : 16/068893
DATED : May 12, 2020
INVENTOR(S) : Engfeldt et al.

Page 1 of 1

It is certified that error appears in the above-identified patent and that said Letters Patent is hereby corrected as shown below:

On the Title Page

Item (30), change "1650030" to --1650030-8--.

Signed and Sealed this
Seventh Day of July, 2020

Andrei Iancu
*Director of the United States Patent and Trademark Office*